(12) United States Patent
Lin

(10) Patent No.: US 7,623,194 B2
(45) Date of Patent: Nov. 24, 2009

(54) PIXEL STRUCTURE AND LIQUID CRYSTAL DISPLAY AND METHOD FOR MANUFACTURING THE SAME

(75) Inventor: Hsiang-Lin Lin, Changhua County (TW)

(73) Assignee: AU Optronics Corp., Hsin-Chu (TW)

( * ) Notice: Subject to any disclaimer, the term of this patent is extended or adjusted under 35 U.S.C. 154(b) by 819 days.

(21) Appl. No.: 11/382,712

(22) Filed: May 11, 2006

(65) Prior Publication Data

US 2007/0171320 A1  Jul. 26, 2007

(30) Foreign Application Priority Data

Jan. 20, 2006   (TW)   ................. 95102377 A

(51) Int. Cl.
   G02F 1/136   (2006.01)
   G02F 1/1343  (2006.01)
(52) U.S. Cl. .............. 349/44; 349/38; 349/43; 349/139
(58) Field of Classification Search .......... 349/38, 349/39, 43, 44, 139
   See application file for complete search history.

(56) References Cited

U.S. PATENT DOCUMENTS

| | | | |
|---|---|---|---|
| 5,760,854 A * | 6/1998 | Ono et al. | 349/38 |
| 6,583,830 B2 | 6/2003 | Yasukawa et al. | |
| 7,576,824 B2 * | 8/2009 | Kim | 349/141 |
| 2004/0189917 A1 | 9/2004 | Tanaka et al. | |
| 2006/0192906 A1 * | 8/2006 | Ryu et al. | 349/43 |
| 2007/0052899 A1 * | 3/2007 | Lin et al. | 349/141 |

* cited by examiner

Primary Examiner—David Nelms
Assistant Examiner—Daivd Y Chung
(74) Attorney, Agent, or Firm—Winston Hsu

(57) ABSTRACT

A pixel structure of a liquid crystal display (LCD) includes a scan line, a data line and a thin film transistor (TFT) disposed on the substrate. The TFT has a source electrically connected to the date line and a gate electrically connected to the scan line. A shielding electrode disposes on the substrate, wherein the same metal layer makes the shielding electrode, the source and the drain. Furthermore, the data line makes at least two different patterned metal, layers which are not formed simultaneously and the patterned metal layers are electrically connected to each other. A pixel electrode covers the part of the shielding electrode and electrically connects to the drain.

24 Claims, 18 Drawing Sheets

PIXEL STRUCTURE AND LIQUID CRYSTAL DISPLAY AND METHOD FOR MANUFACTURING THE SAME

BACKGROUND OF THE INVENTION

1. Field of the Invention

The present invention relates to a pixel structure and a manufacturing method of a liquid crystal display (LCD) and, more particularly, to a pixel structure for reducing a parasitic capacitance (Cpd), and to a method for manufacturing thereof.

2. Description of the Prior Art

Liquid crystal displays (LCDs) have become highly popular display devices on the technology market as they have a small volume and low divergence. The aperture ratio of the pixel structures in an LCD manufacturing process influences the utilization of a back light module that in turn influences the brightness of the LCD. Therefore, how to increase the aperture ratio of the pixel structure is an important direction of LCD research.

In general, the major factor influencing the aperture ratio of the pixel structure is the width between a pixel electrode and a data line. When the pixel electrode is too close to the data line, a different voltage from the data line before the next frame will influence the holding voltage of the pixel electrode. That will result a cross talk issue and decrease the quality of the LCD.

Referring to FIG. 1 schematically illustrates the pixel structure of the prior art. An array structure of an LCD has a thin film transistor (TFT) 102, a plurality of data lines 104 that are parallel with each other, and a plurality of scan lines 106 that are parallel with each other. The data lines 104 cross the scan lines 106 to define a plurality of pixel structure 108. Each of the plurality of pixel structure 108 has a pixel electrode 110, and a shielding electrode 112 under the pixel electrode 110.

Referring to FIG. 2 schematically illustrates the cross section view of FIG. 1 along the line AA'. As FIG. 2 shows, the shielding electrode 112 is covered by an insulating layer such as a gate insulating layer 122. The data line 104 disposes on the gate insulating layer 122 and disposes between the two shielding electrodes 112. The gate insulating layer 122 and the data line 104 are covered by a passivation layer 124. The pixel electrode 110 disposes on the passivation layer 124. The parasitic capacitance (Cpd) being disposes between the pixel electrode 110 and the data line 104 is one factor influencing the crosstalk. The storage capacitance (Cst) 128 includes the pixel electrode 110, the passivation layer 124, the gate insulating layer 122, and the shielding electrode 112.

In the prior art, the data line and the pixel electrode have a fixed width in order to decrease the Cpd. As the width between the data line and the pixel electrode becomes wider, and the aperture ratio becomes lower, the utilization of the back light module decreases. Another method to decrease the effect of Cpd is by increasing the ratio of the storage capacitance to decrease the ratio of the Cpd divided by the total capacitances. In general, increasing the overlapped area between the two electrodes of the storage capacitance can achieve this result. In general manufacture, however, one electrode of the storage capacitance is usually made by an opaque metal layer. To increase the storage capacitance by adding overlapped area will decrease the aperture ratio of the pixel structure.

SUMMARY OF THE INVENTION

The present invention relates a pixel structure and a method for manufacturing a liquid crystal display (LCD) to solve the above-mentioned problem.

In one embodiment of the present invention a pixel structure in an LCD is provided. The pixel structure comprises a scan line and a data line disposed on a substrate, the data line crosses over the scan line. A TFT disposed on the substrate has a gate, a source and a drain. The source electrically connected to the data line, the gate electrically connected to the scan line. The same metal layer makes a shielding electrode disposed on the substrate, the source, and the drain. The shielding electrode has at least one main segment being substantially parallel to the data line and disposed between the edge of the pixel electrode and the data line. The data line is made by two metal pattern layers that electrically connected to each other, and are not formed simultaneously. Furthermore, a pixel electrode covers the shielding electrode and electrically connected to the drain.

In another embodiment of the present invention a pixel structure in an LCD is provided. The pixel structure comprises a scan line and a data line disposed on a substrate, the data line crosses over the scan line. A TFT disposed on the substrate has a gate, a source and a drain. The gate electrically connected to the scan line, the source electrically connected to the data line, the drain electrically connected to the pixel electrode. A shielding electrode covers the part of the pixel electrode, wherein the shielding electrode and the scan line are made by the same metal layer. The shielding electrode has a main segment which being substantially parallel to the data line and disposed between the edge of the pixel electrode and the data line.

In another embodiment of the present invention a method for manufacturing an LCD is provided. A scan line and one connecting electrode are formed on a substrate respectively. An insulating layer formed on the substrate and covers the scan line and the connecting electrode, and the insulating layer has at least one first hole positioned on the connecting electrode and to expose part of the connecting electrode. A channel formed on the insulating layer and the channel layer positioned on a gate. An ohm contact pattern layer formed on the channel layer. A metal layer formed on the ohm contact pattern layer, where the metal layer is positioned on the scan line defines a source/drain to form a TFT. The metal layer positioned on the insulating layer defines at least one shielding electrode. The shielding electrode has a main segment, which is substantially parallel to the connecting electrode and disposed between an edge of the pixel electrode and the connecting electrode. At least one part of the metal layer crosses over the scan line, and through the first hole electrically connected to the connecting electrode to form a data line. A passivation layer covers the metal layer, and the passivation layer has one hole positioned on the source/drain. A pixel electrode formed on the passivation layer and covers part of the shielding electrode, and the pixel electrode through the hole electrically connects to the source/drain.

In another embodiment of the present invention a method for manufacturing an LCD is provided. A pixel electrode formed on a substrate. A barrier pattern layer formed on the substrate and covers the part of the pixel electrode. A scan line and at least one shielding electrode formed on the barrier pattern layer. The scan line disposes along a first direction, and a part of the shielding electrode has at least one main shielding electrode covering part of the pixel electrode along a second direction. An insulating layer formed on the barrier pattern layer and covers the scan line and the shielding electrode. A channel layer and an ohm contact pattern layer formed sequentially on the insulating layer. A first hole formed in the pixel electrode and removes the barrier pattern layer and the insulating layer on the pixel electrode. A data line and a source/drain formed, where the data line is parallel with the main segment shielding electrode along the second direction. The source/drain disposes on a gate, thereby formed a TFT. The source connects electrically to the data line, and the drain through the first hole electrically connects to the pixel electrode and cover a passivation layer on the metal layer and the barrier pattern layer.

Please notice, the present invention is not necessarily limited to the source electrically connected to the data line, and the drain electrically connected to the pixel electrode. The present invention also can utilize the drain electrically connected to the data line, and the source electrically connected to the pixel electrode.

As the metal layer of the shielding electrode in the present invention disposes between the pixel electrode and the data line, the shielding electrode has an electric field shielding effect that decreases the parasitic capacitance (Cpd). The width between the edge of the pixel electrode and the data line can decrease, and the aperture ratio therefore increases. Furthermore, the storage capacitance of the present invention can have a larger value, and the aperture ratio does not need to be changed. The larger value of the storage capacitance can decrease the effect of the other Cpd in order to achieve a stable display quality.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
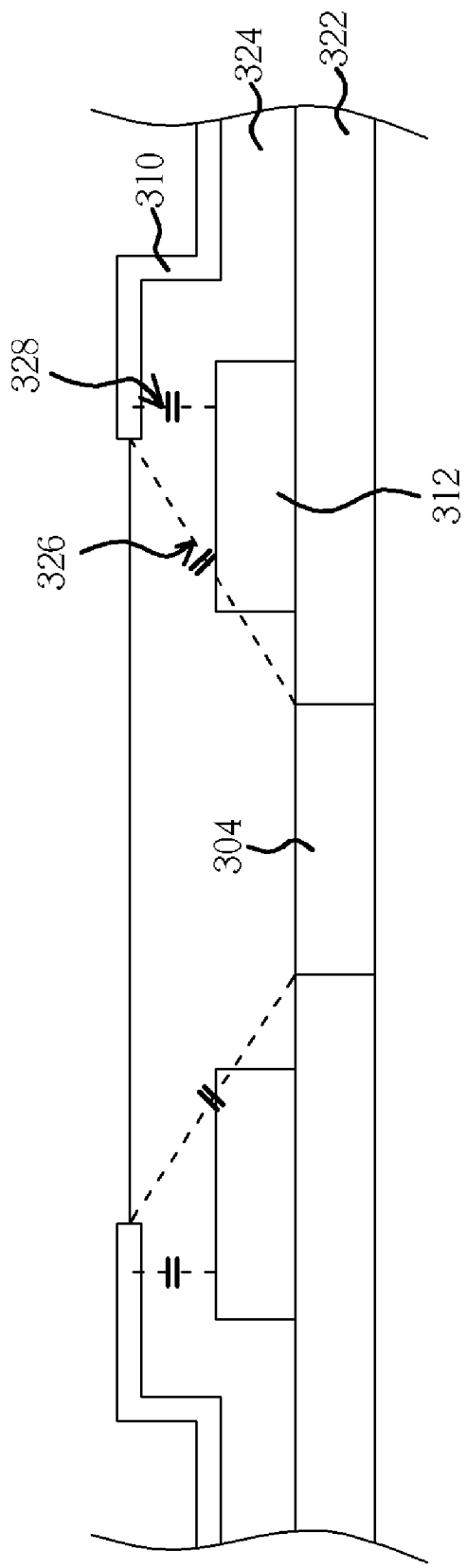
FIG. 3 schematically illustrates a Cpd and storage capacitance of the present invention.

Referring to FIG. 3. FIG. 3 schematically illustrates a Cpd and a storage capacitance of the present invention. As FIG. 3 shows, a gate insulating layer 322 covers a data line 304, and a shielding electrode 312 disposes on the gate insulating layer 322. A passivation layer 324 covers the gate insulating layer 322 and the shielding electrode 312, and a pixel electrode disposes on the passivation layer 324. In this embodiment, the pixel electrode 310, the passivation layer 324, the gate insulating layer 322, and the data line 304 form the Cpd 326. Additionally, a storage capacitance 328 includes the pixel electrode 310, the passivation layer 324, and the shielding electrode 312.

Figure 1:
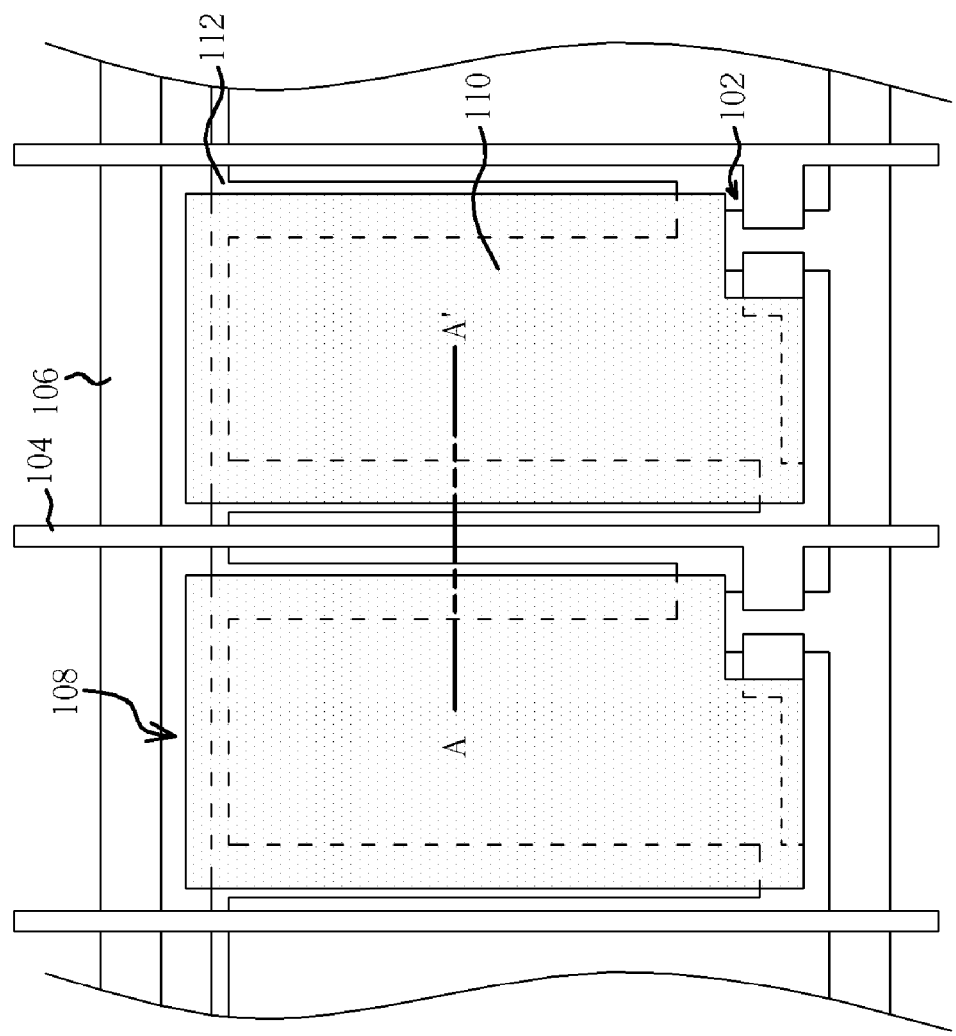
FIG. 1 schematically illustrates the pixel structure of the prior art.
Figure 2:
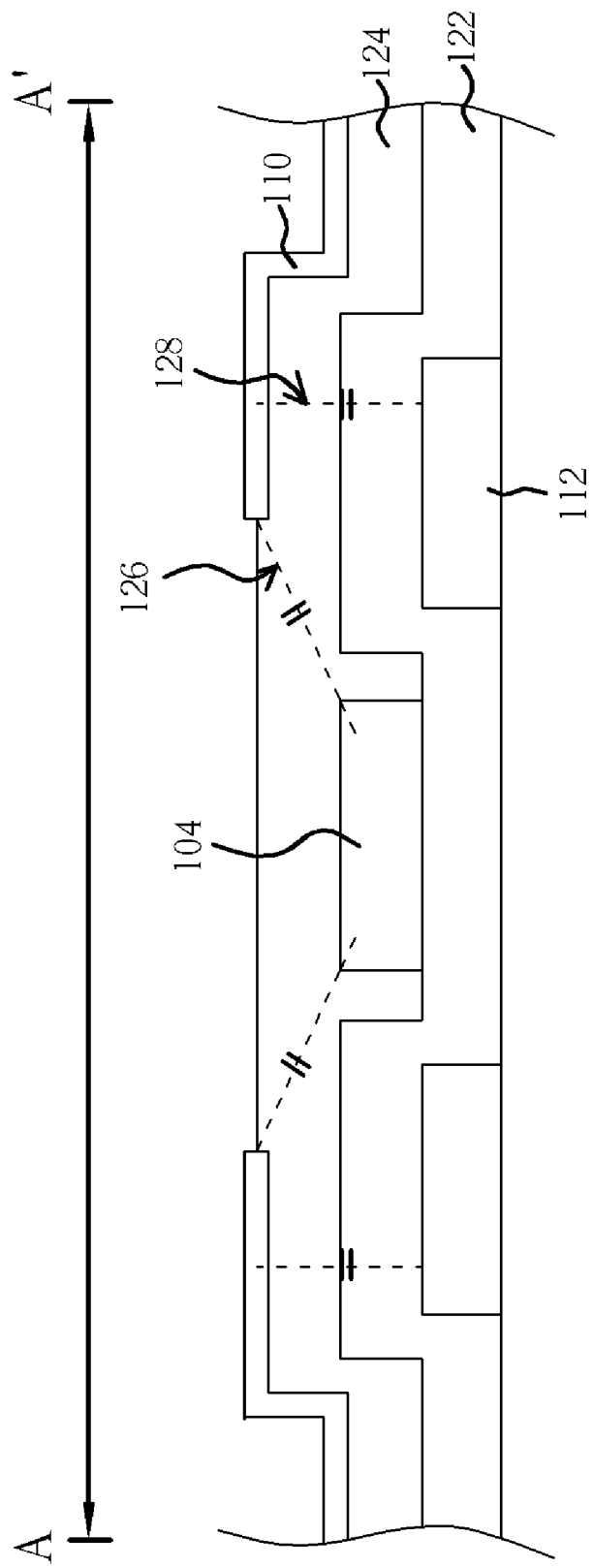
FIG. 2 schematically illustrates the cross view of FIG. 1 along the line AA'.

The advantages of changing the structure of the data line, the pixel electrode, and the shielding electrode from that shown in FIG. 2 into that shown in FIG. 3 are many.

A first advantage is increasing the storage capacitance. In the embodiment shown in FIG. 3, the capacitance dielectric layer of the storage capacitance 328 is the passivation layer 324. In the embodiment of FIG. 2, however, the dielectric layer of the storage capacitance 128 includes the passivation layer 124 and the gate insulating layer 122. According to the parallel capacitance formula: $Cs=(\in_0.\in.A)/d$ (where d is the thickness of the capacitance dielectric layer, A is the overlapped area of the capacitances, and $\in$ is the dielectric constant of capacitance dielectric layer), and under a same manufacturing condition, the capacitance value of the storage capacitance 328 is increased due to the thickness (d) of the dielectric layer in FIG. 3. The larger capacitance value makes the ratio of the Cpd divided by the total capacitances decrease, ensuring cross talk will not occur. The effect of the LCD improves, and the storage capacitance and the aperture ratio have more design space.

Figure 4:
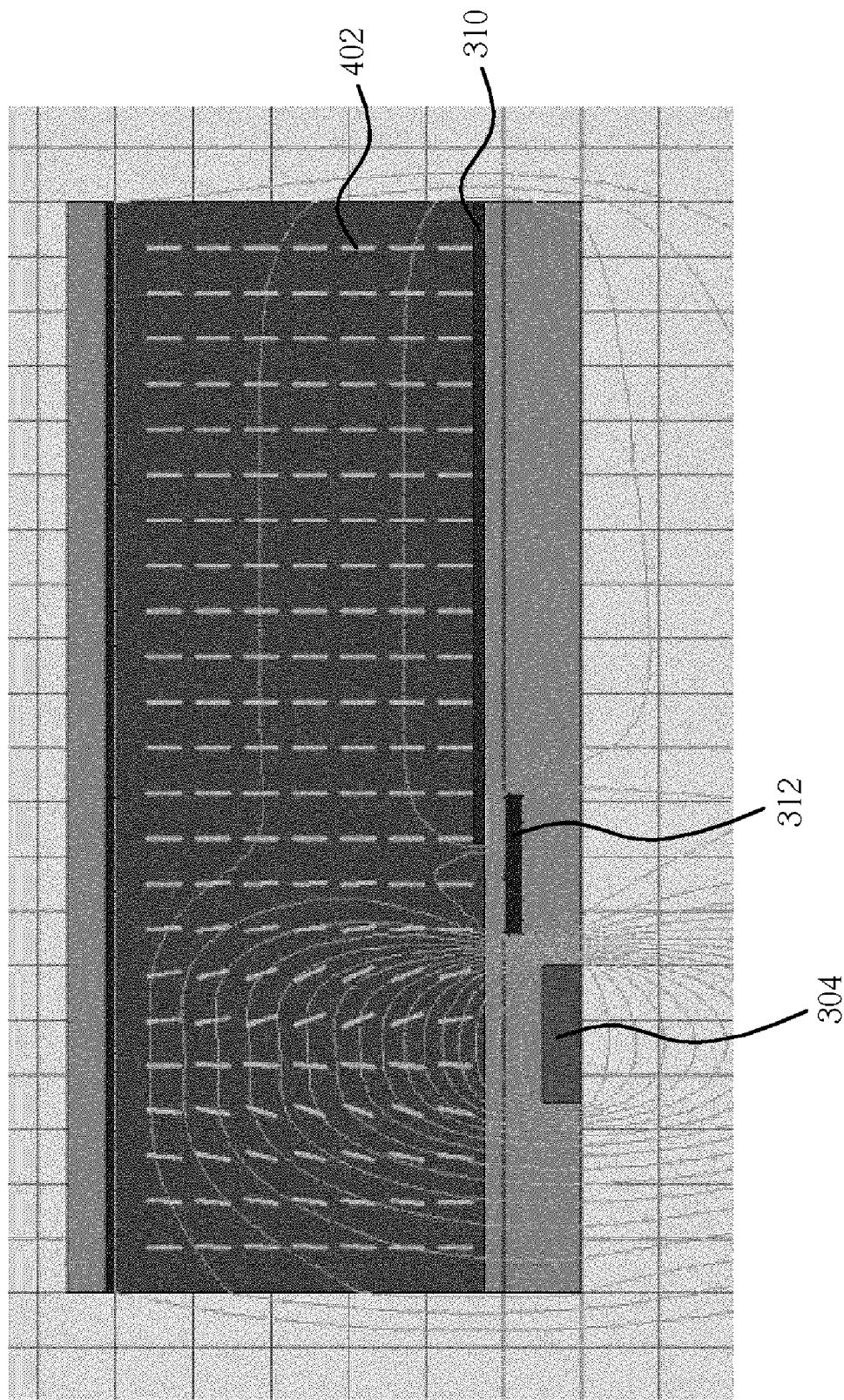
FIGS. 4 to 5 illustrate liquid crystal under an electric field shielding effect of the data line utilizing 2D-MOS software.
Figure 5:
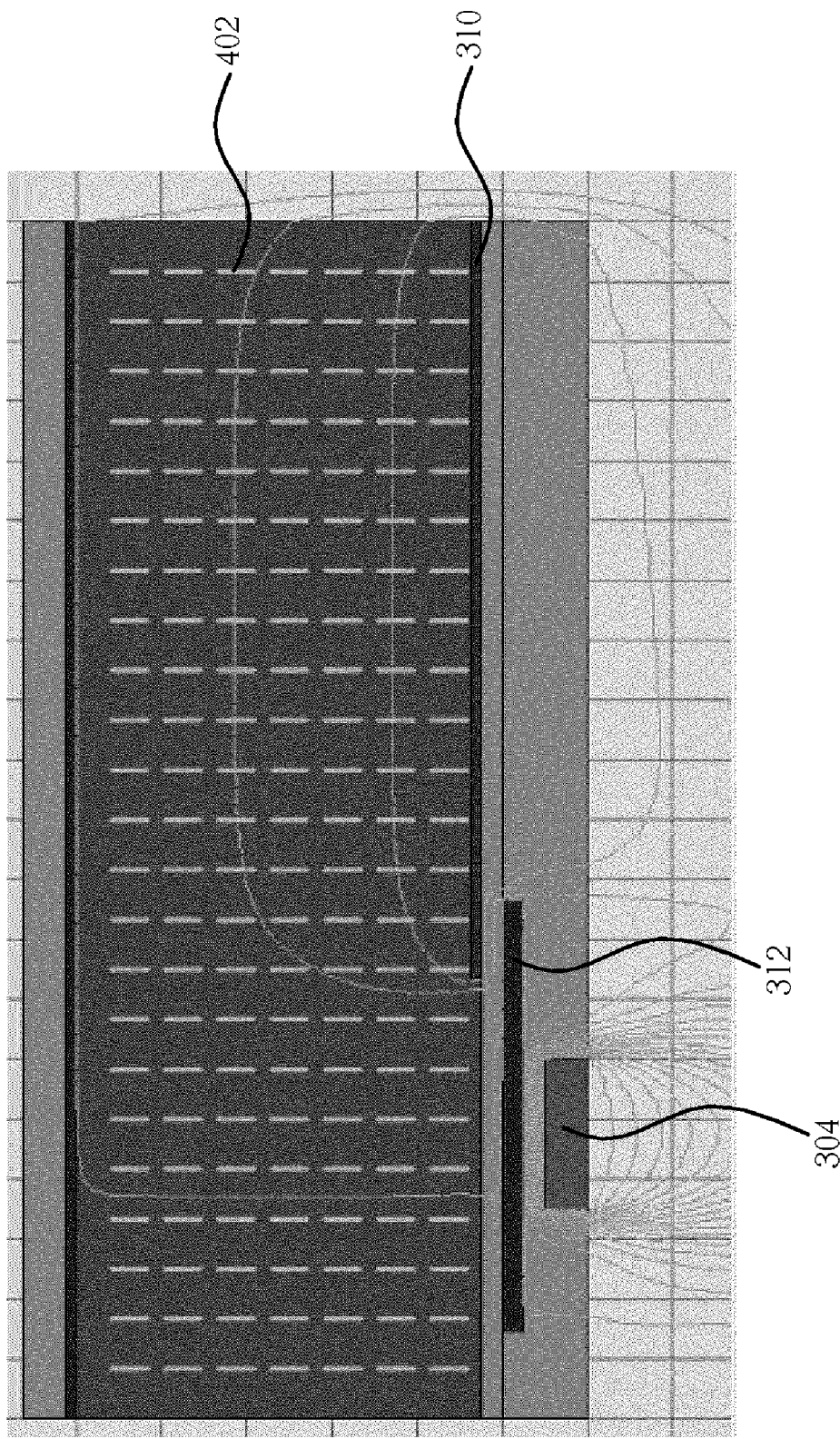

A second advantage is the electric field shielding effect of the shielding electrode. FIGS. 4 to 5 illustrate the liquid crystal under the electric field shielding effect of the data line utilizing 2D-MOS software. As FIG. 4 shows, the shielding electrode 312 disposes between the data line 304 and the pixel electrode 310. The effect of the electric field of the data line 304 on the liquid crystal near the pixel electrode 310 and the pixel line 304 is decreased. Instead, the pixel electrode 310 and the liquid crystal 402 will be influenced by the electric field of the shielding electrode 312. As FIG. 5 shows, when the shielding electrode 312 covers the data line 304 completely, the electric field of the data line 304 is completely shielded by the shielding electrode 312. Therefore, the liquid crystal 402 will not be influenced by the electric field of the data line 304. Furthermore, the Cpd will not exist between the pixel electrode 310 and the data line 304. Therefore, if a shielding electrode disposes between the pixel electrode and the data line, the edge of the pixel electrode can be closer to the data line to increase the aperture ratio of the pixel.

The following four embodiments can be taken as exemplary examples. The four embodiments are illustrated herein to show their structures and the related manufacturing methods:

THE FIRST EMBODIMENT

Figure 6:
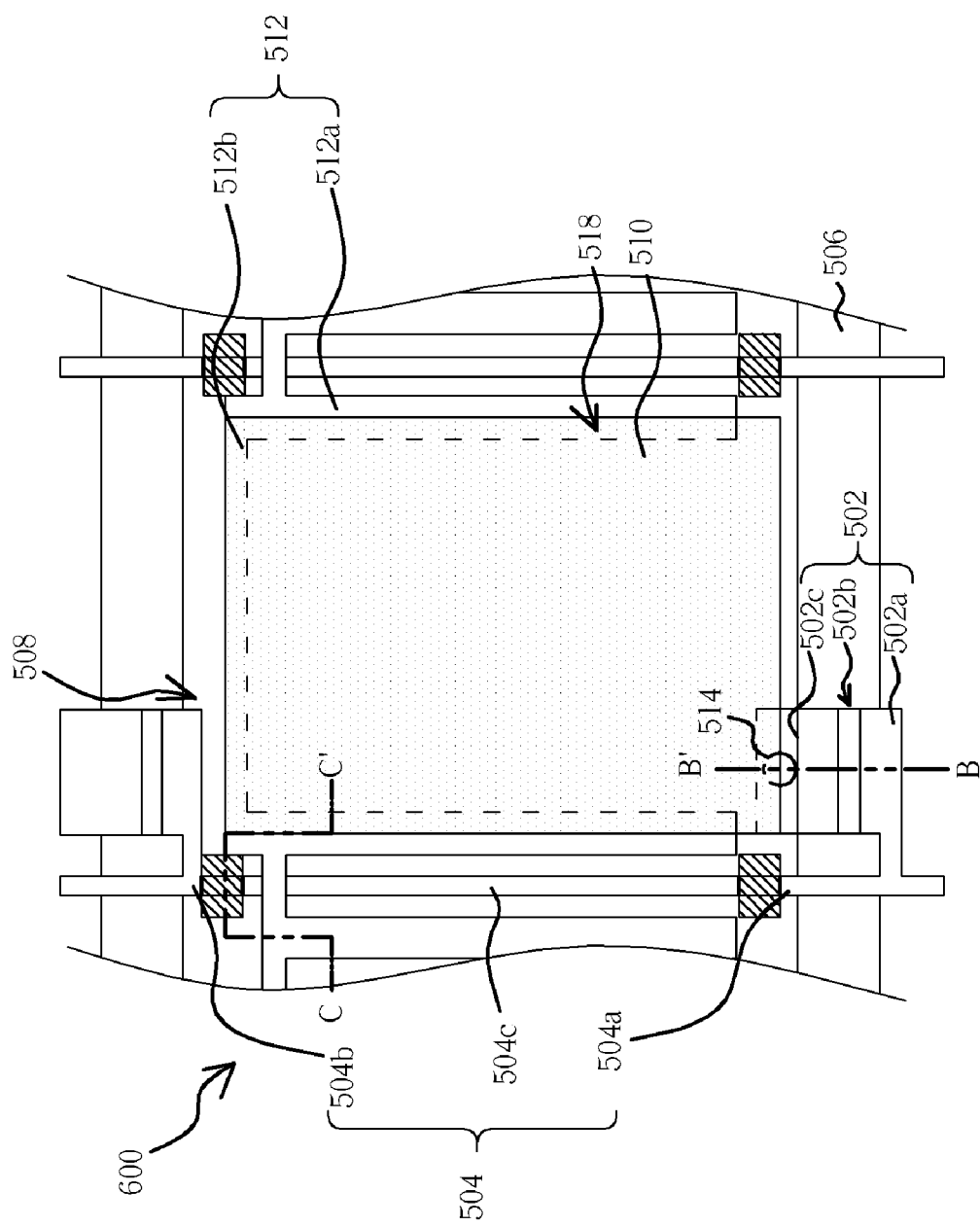
FIG. 6 schematically illustrates a pixel structure of another embodiment of the present invention.

Referring to FIG. 6 schematically illustrates a pixel structure of an embodiment of the present invention. The pixel structure 508 is located in an LCD, and the pixel structure 508 includes a scan line 506 is along a first direction disposed on the substrate 600, a connecting electrode 504c is along a second direction, and a data line section 504a crossing over the scan line 506 and via the connecting electrode 504c electrically connected to the other data line section 504b to form a complete data line 504. The scan line 506 and the data line 504 crossed with each other to define a matrix pixel structure 508.

The pixel structure 508 includes a TFT 502 having a gate 502b, a source 502a, and a drain 502c. The drain 502c electrically connected to the data line 504, and the gate 502b electrically connected to the scan line 506. Furthermore, the pixel structure 508 has a shielding electrode 512. The shielding electrode 512 includes a main segment shielding electrode 512a being parallel to the connecting electrode 504c of the data line 504. At least one minor segment shielding electrode 512b disposed between the main segment shielding electrodes 512a and electrically connected to the main segment shielding electrodes 512a. The shielding electrode 512, the source 502a, the drain 502c, and the data line sections 504a, 504b are made by the same metal layer.

The pixel electrode 510 disposed on the substrate 600 and covers part of the shielding electrode 512 electrically connected to the drain 502c through the contact hole 514. The pixel electrode 510 and the shielding electrode 512 being covered by the pixel electrode 510 are made by a storage capacitance 518.

Figure 7:
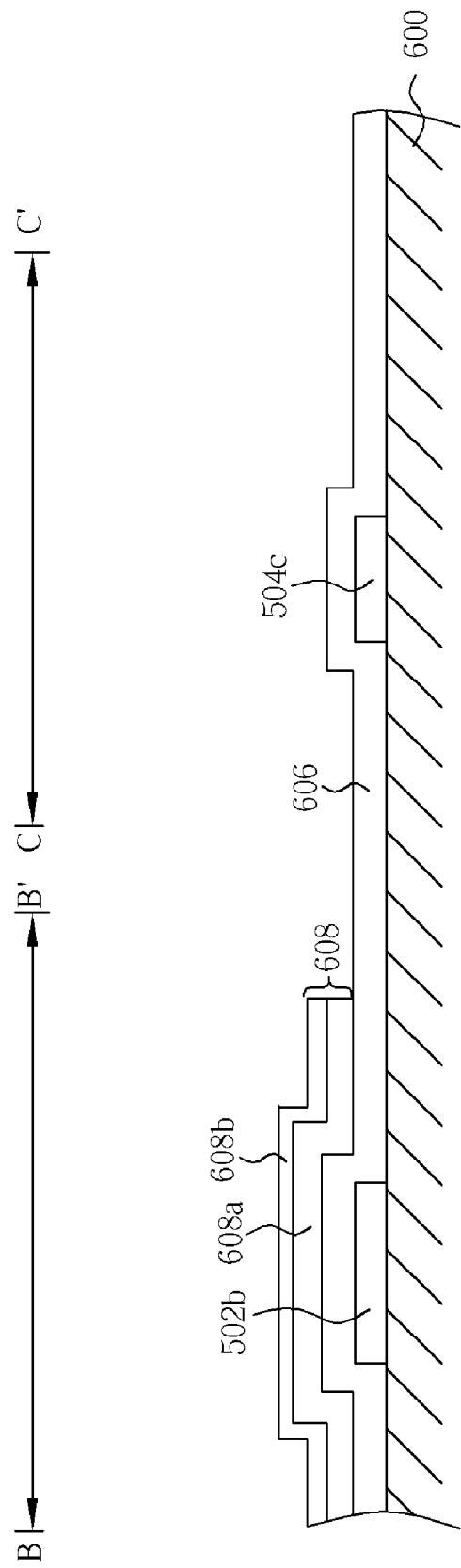
FIGS. 7 to 9 schematically illustrate the manufacture of FIG. 6 along lines BB' and CC'.
Figure 8:
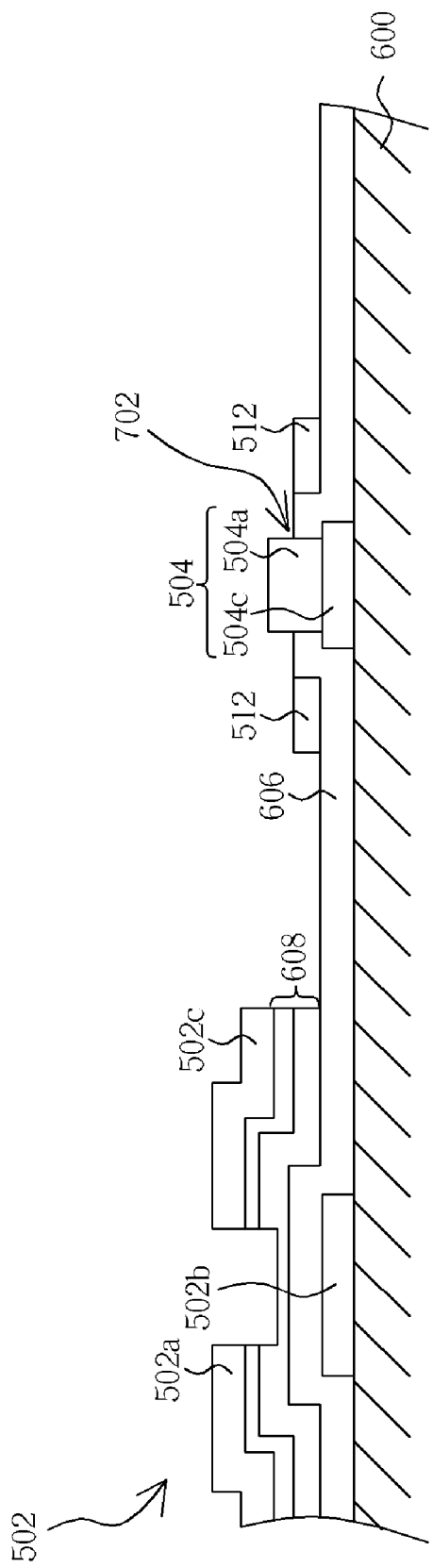
Figure 9:
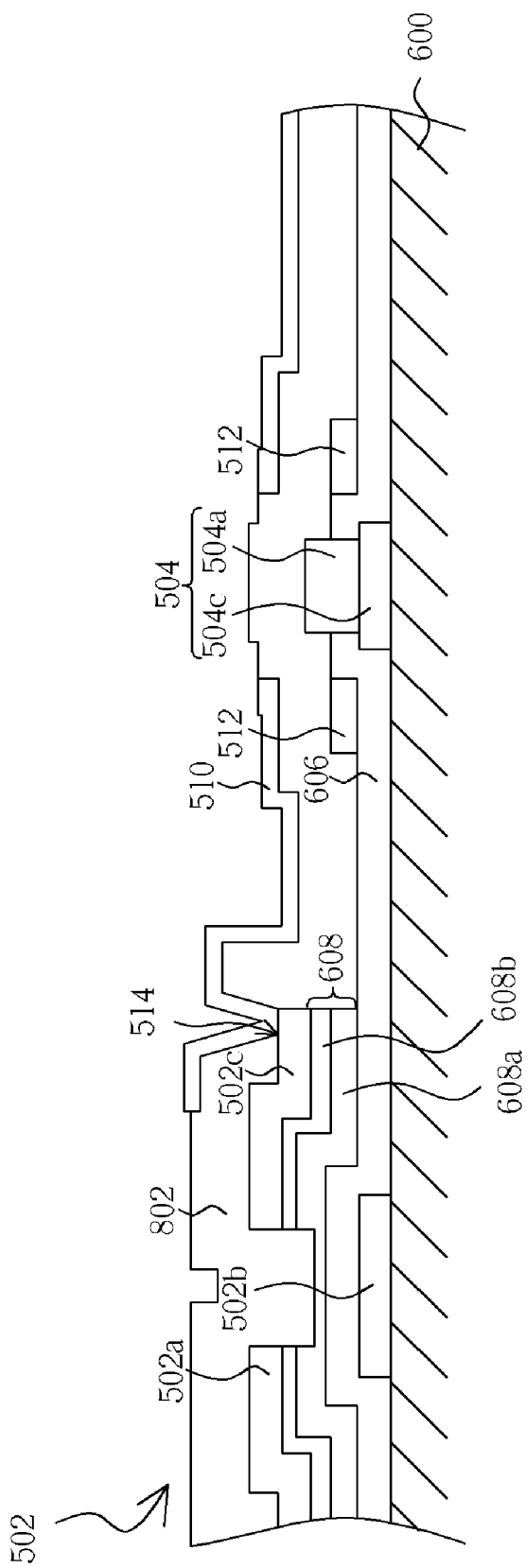

Referring to FIGS. 7 to 9 schematically illustrates manufacture of FIG. 6 along lines BB' and CC'. Referring to FIG. 7, a patterning metal layer is formed on the substrate 600. The patterning metal layer includes the scan line along the first direction in an arrangement, the gate 502b, and a connection electrode 504c along the second direction in an arrangement. Then, an insulating layer such as a gate insulating layer 606 is formed on the gate 502b, the connection electrode 504c, and the substrate 600 by a plasma chemical vapor deposition process. Next, a transistor channel 608 is formed on the gate insulating layer 606 of the gate 502b by two chemical vapor deposition processes. An a-Si layer, and a dopant amorphous silicon layer are disposed on the gate insulating layer 606. After an etching process, the a-Si layer forms a channel layer 608a and the dopant amorphous silicon layer, so as to form a transistor channel 608, and form an ohm contact pattern layer 608b.

Referring to FIG. 8. The etching process removes part of the gate insulating layer 606 on the connecting electrode 504c to form an opening 702. A patterning metal layer is formed to be the source 502a of the TFT 502, the drain 502c of the TFT 502, and the shielding electrode 512. A part of the patterning metal layer fills into the opening 702 so as to form the data line section 504a on the connecting electrode 504c. The connecting electrode 504c and the data line section 504a being electrically connected to each other to form a part of the data line 504.

Referring to FIG. 9, a dielectric layer 802 covering the TFT 502, the shielding electrode 512, and the data line 504 as a passivation layer. The material of the dielectric layer 802 can be comprises silicon nitride, silicon oxide, silicon oxynitride, combinations thereof, or similar combinations. Then, etching the dielectric layer 802 to form the contact hole 514 to expose part of the surface of the drain 502c. Next, the pixel electrode 510 disposes on the dielectric layer 802 and is filled into the contact hole 514 so as to the pixel electrode 510 through the contact hole 514 electrically connects to the drain 502c. In the present embodiment, the pixel electrode 510, the dielectric layer 802, and the shielding electrode 512 being covered by the pixel electrode 510 to form the main storage capacitance. Please note that the CC' line shown in FIG. 6 is the part of the data line section 504a of the data line 504 that connects to the connecting electrode 504. As FIG. 6 shows, this is because the shielding electrode 512 location between the pixel electrode 510 and the data line 504c has an electric field shielding effect, in order to decrease the influence of the data line 504c on the Cpd of the pixel electrode 510. The edge of the pixel electrode can therefore be closer to the data line to increase the aperture ratio.

THE SECOND EMBODIMENT

The pixel structure of the second embodiment is similar to the first embodiment, therefore FIG. 6 can also adequately illustrate the second embodiment. The manufacture of the first embodiment is different from the second embodiment, however. The first embodiment is made by a back channel etching (BCE) process to form the TFT, whereas the second embodiment is made by an etching stop process to form the TFT. Therefore, the cross-section view of the second embodiment is different from the first embodiment.

Figure 10:
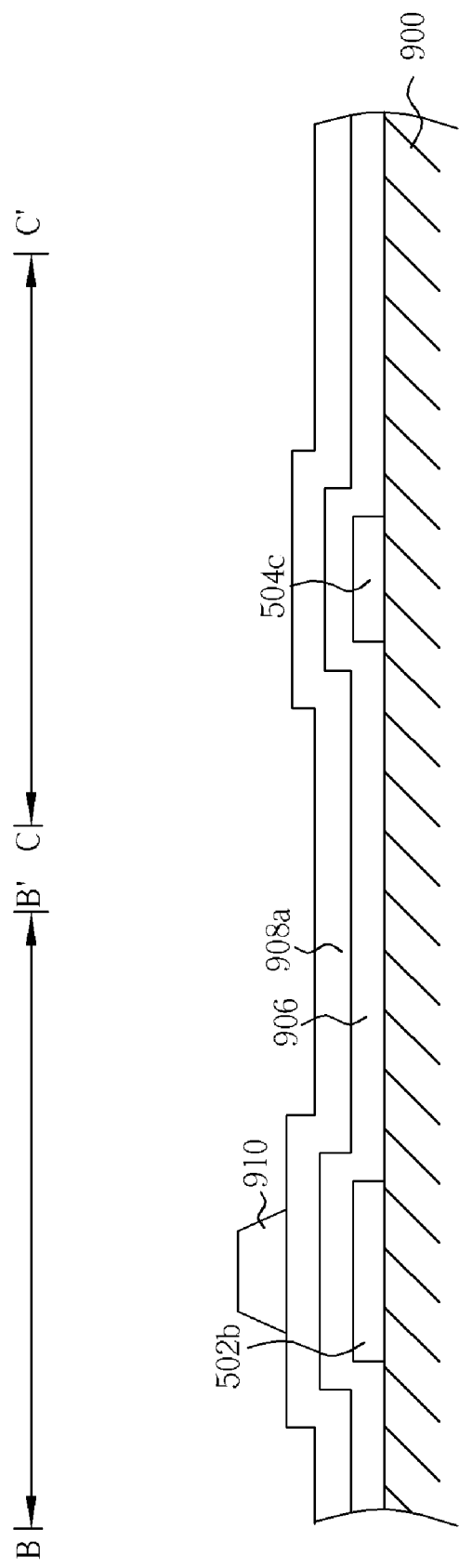
FIGS. 10 to 13 schematically illustrate the manufacture of FIG. 6 along lines BB' and CC'.

Referring to FIGS. 10 to 13 are schematically illustrating the manufacture of FIG. 6 along lines BB' and CC'. Referring to FIG. 10. A patterning metal layer is formed on the substrate 900. The patterning metal layer includes a scan line (not shown) along the first direction in an arrangement, a gate 502b location on the scan line, and the connecting electrode 504c along the second direction in an arrangement. Then, an insulating layer such as a gate insulating layer 906 and a channel layer 908a are disposed on the gate 502b, the connecting electrode 504c, and the substrate 900 by a plasma chemical vapor deposition process. Next, a dielectric layer is disposed and an etching process is performed to form an island insulating layer 910 as the etching stop pattern.

Figure 11:
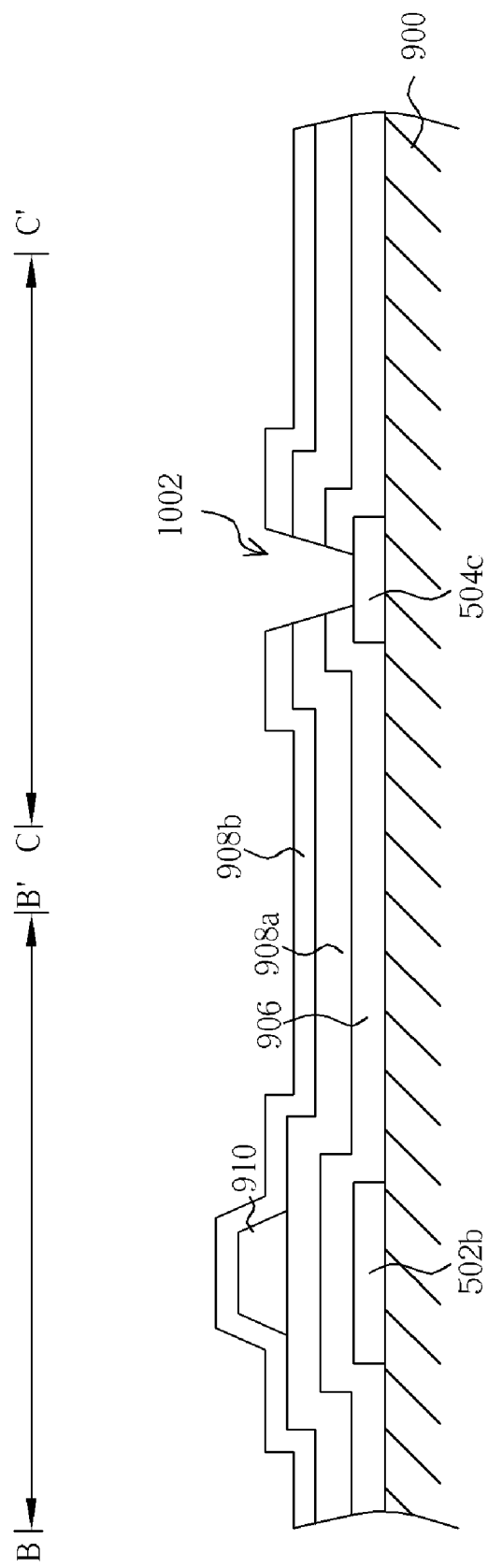

Referring to FIG. 11, which shows performing a chemical vapor deposition process to form an ohm contact pattern layer 908b. A part of the gate insulating layer 906 location on the connecting electrode 504c, the channel layer 698a, and the ohm contact pattern layer 908b are removed to form an opening 1002 to expose the part of the connecting electrode 504c.

Figure 12:
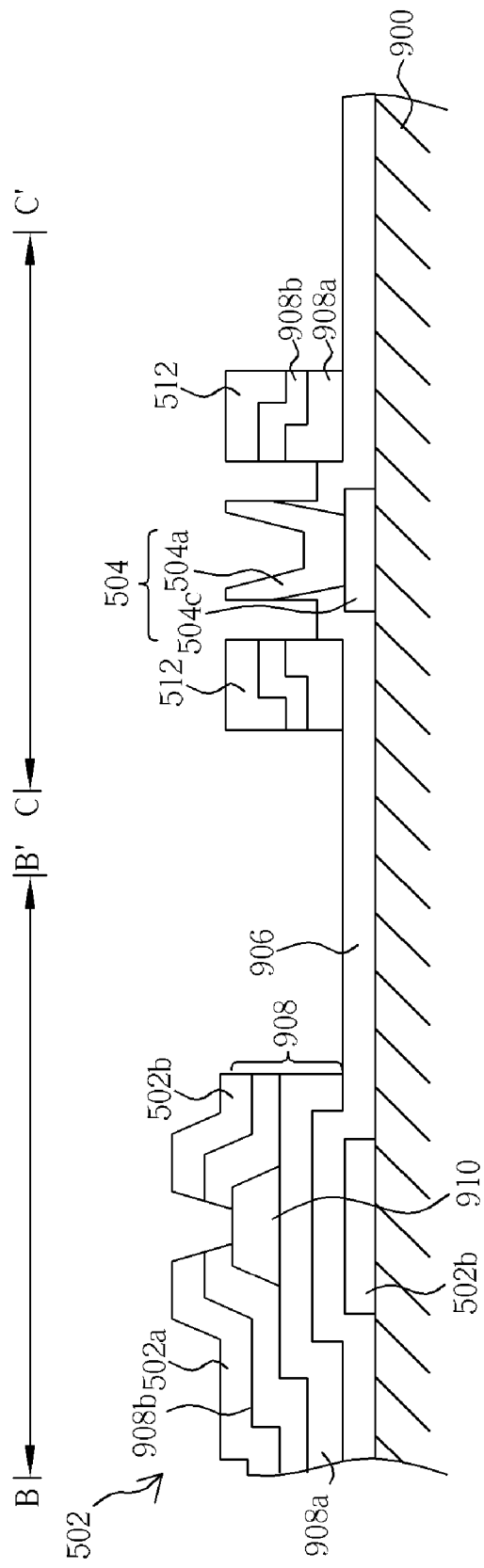

Referring to FIG. 12, which shows forming a patterning metal layer including the source 502a of the TFT 502, the drain 502c of the TFT 502, the shielding electrode 512, and a data line section 504a location on the connecting electrode 504c. The connecting electrodes 504c and data line section 504a electrically connect to each other to form the data line 504. Then, the patterning metal layer is taken as a hard mask to perform an etching process, and remove the uncovered ohm contact pattern layer 908b and the uncovered channel layer 908a by the patterning metal layer. Otherwise, the etching process takes the island insulating layer 910 and the gate insulating layer 906 as the etching stop layer, then a transistor channel 908 on the gate 502b is formed. The TFT 502 includes the source 502a, the drain 502c, and the gate 502b.

Figure 13:
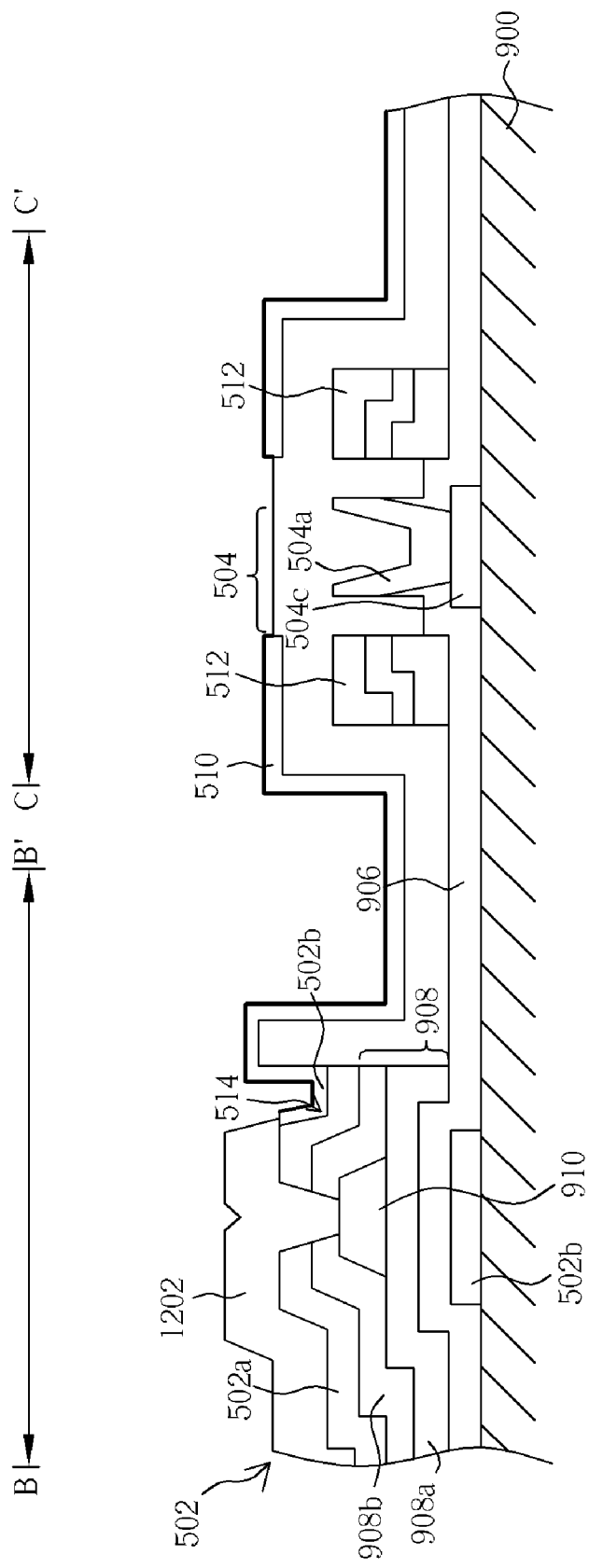

Referring to FIG. 13. A dielectric layer 1102 as a passivation layer to cover the TFT 502, the shielding electrode 512, and the date line 504. The dielectric layer 1102 can be comprises silicon nitride, silicon oxide, silicon oxynitride, combinations thereof, or similar combinations. The dielectric layer 1202 having a contact hole 514 is formed on the drain 502c by an etching process. Next, a pixel electrode 510 is formed on the dielectric layer 1202 and to fill into the contact hole 514. The pixel electrode 510 via the contact hole 514 electrically connects to the drain 502c. In present embodiment, the pixel electrode 510, the dielectric layer 1202, and the shielding electrode 512 to form the main storage capacitance.

THE THIRD EMBODIMENT

Figure 14:
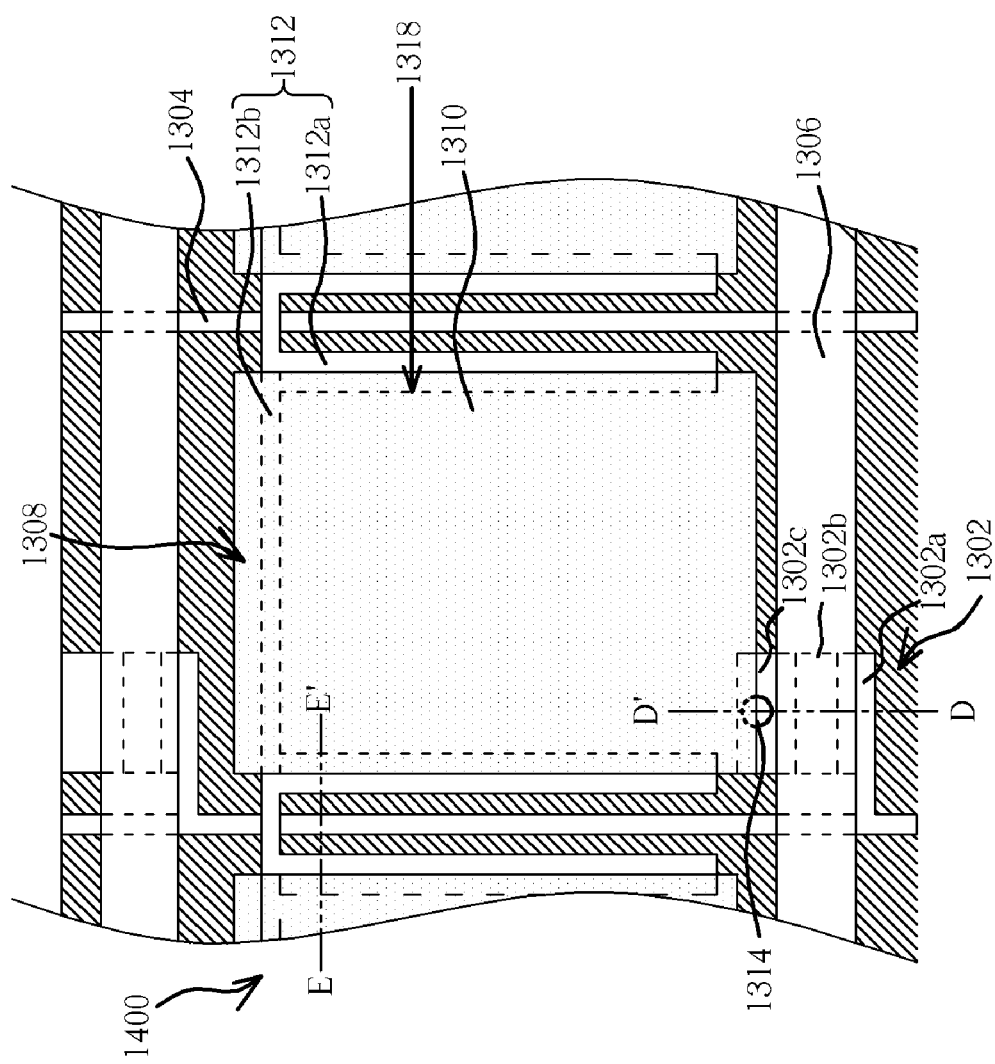
FIG. 14 schematically illustrates a pixel structure of another embodiment according to the present invention.

Referring to FIG. 14. FIG. 14 schematically illustrates a pixel structure of another embodiment according to the present invention. The pixel structure 1308 applies to an LCD. The pixel structure 1308 includes a data line 1304 disposed on the substrate 1400 along a first direction, and a scan line 1306 along a second direction that crosses over the data line 1304. The pixel structure 1308 further includes a TFT 1302 having a gate 1302*b*, a source 1302*a*, and a drain 1302*c*. The gate 1302*b* electrically connected to the scan line 1306, the source 1302*a* electrically connected to the data line 1304, and the drain 1302 via the contact hole 1314 electrically connected to the pixel electrode 1310. The pixel structure 1308 includes a shielding electrode 1312 having a main segment shielding electrode 1312*a* is parallel to the data line 1304 and covered part of the pixel electrode 1310, and a minor shielding electrode 1312*b* electrically connecting to the main segment shielding electrode 1312*a*. Please note that the shielding electrode 1312 and the gate 1302*b* are made by the same metal layer form the gate 1302*b*. Additionally, the pixel structure 1308 further includes a pixel electrode 1310 covering the substrate 1400. The pixel electrode 1310 and covers part of the shielding electrode 1312 and electrically connects to the drain 1302*c*. The pixel electrode 1310 and the part of the shielding electrode 1312 being covered by the pixel electrode 1310 to form a storage capacitance 1318.

Figure 15:
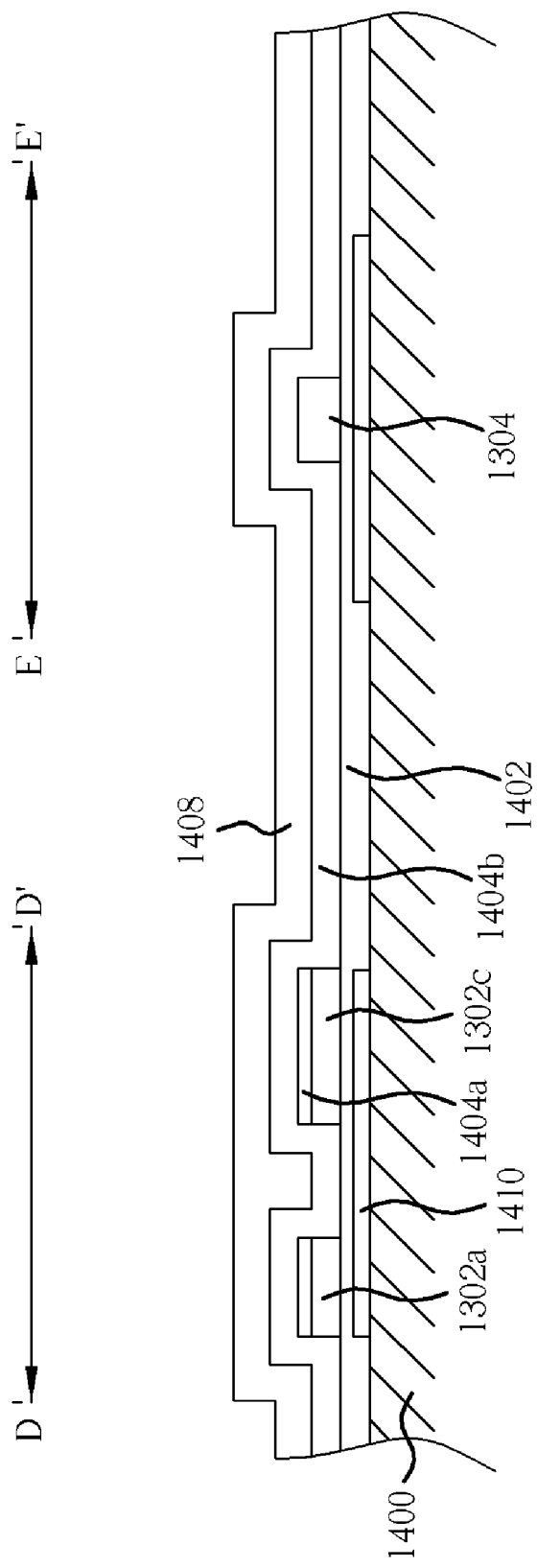
FIGS. 15 to 16 schematically illustrate the manufacture of FIG. 14 along lines DD' and EE'.
Figure 16:
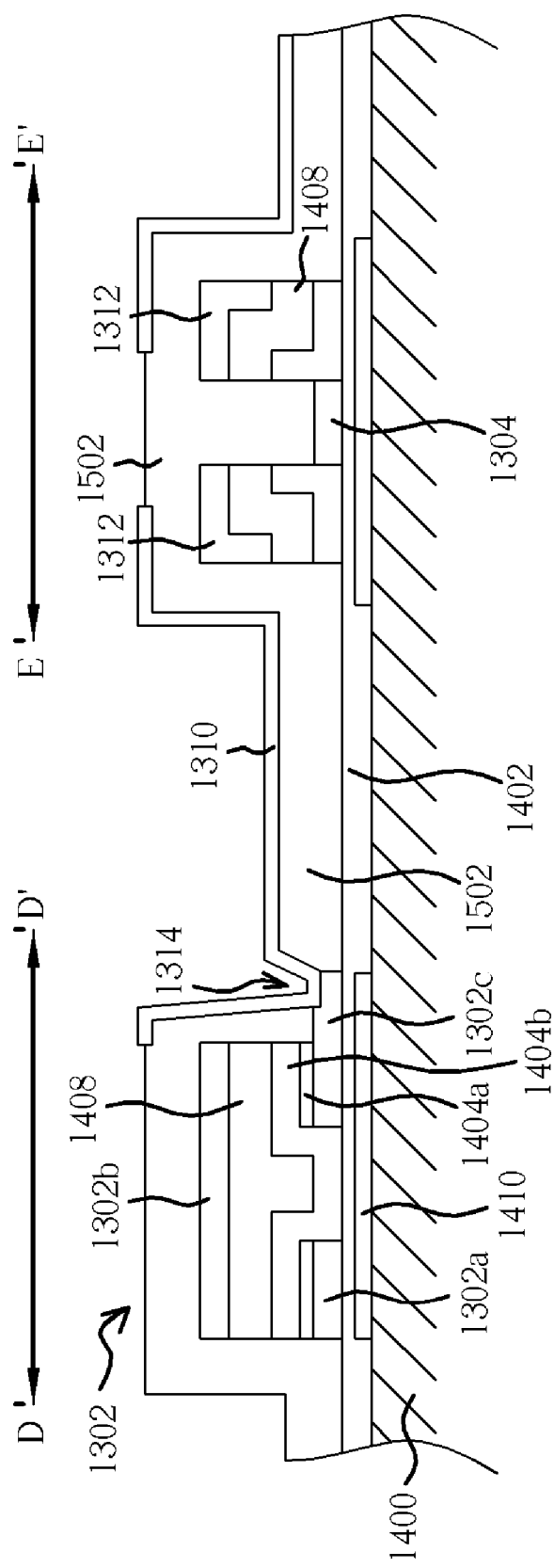

Referring to FIGS. 15 to 16 schematically illustrate the manufacture of FIG. 14 along lines DD' and EE'. Referring to FIG. 15. Firstly, a plurality of light shielding layer 1410 are formed on a substrate 1400, and a barrier pattern layer 1402 is formed to cover the light shielding layers 1410 and the substrate 1400. Then, a patterning metal layer is formed on the barrier pattern layer 1402. A part of the patterning metal layer as source 1302*a*, a drain 1302*c*, and a data line 1304. An ohm contact pattern layer 1404*a* is formed on the source 1302*a*, and the drain 1302*c*. Next, a channel layer 1404*b* is disposed on the substrate 1400 by a chemical vapor deposition process. Then, an insulating layer such as a gate insulating layer 1408, which is disposed on the channel layer 1404*b*.

Referring to FIG. 16. A patterning metal layer is formed and as a gate 1302*b* of the TFT 1302 and the shielding electrode 1312. At the same time, using the patterning metal layer is as a hard mask layer to remove the gate insulating layer 1408 and the channel layer 1404*b* uncovered by the patterning metal layer by an etching process. Then, a dielectric layer 1502 is disposed and as a passivation layer, which can be comprises silicon nitride, silicon oxide, silicon oxynitride, combinations thereof, or similar combinations. Next, the dielectric layer 1502 having a contact hole 1314 is formed on the drain 1302*c* by an etching process. Thereafter, a pixel electrode 1310 is formed on the dielectric layer 1502, and fills into the contact hole 1314 to enable the pixel electrode 1310 through the contact hole 1314 electrically connect to the drain 1302*c*. In the present embodiment, the main storage capacitance is formed by the pixel electrode 1310, the dielectric layer 1302, and the shielding electrode 1312.

THE FOURTH EMBODIMENT

Figure 17:
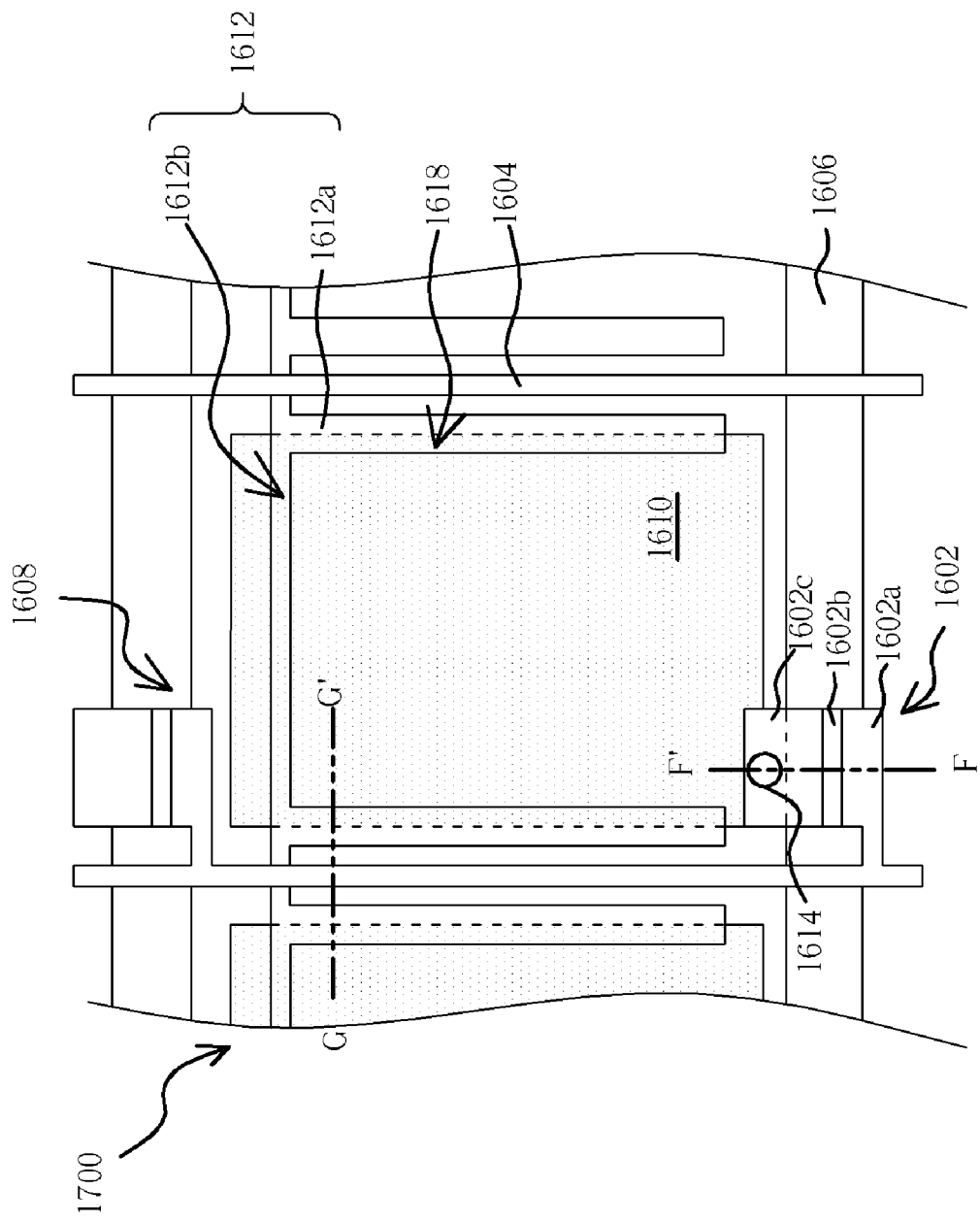
FIG. 17 schematically illustrates the pixel substrate of another embodiment according to the present invention.

Referring to FIG. 17, which schematically illustrates the pixel substrate of another embodiment according to the present invention. The pixel structure 1608 is applied to an LCD. The pixel structure 1608 comprises a pixel electrode 1610 disposed on the substrate 1700, a data line 1604 along a first direction in an arrangement, and a scan line 1606 along a second direction in an arrangement, wherein the data line 1604 crosses over the scan line 1606. The pixel structure 1608 further comprises a TFT 1602 having a gate 1602*b* electrically connects to a scan line 1606, a source 1602*a* electrically connects to the data line 1604, and a drain 1602*c* through the contact hole 1614 electrically connects to the pixel electrode 1610. Furthermore, the pixel structure 1608 also includes a shielding electrode 1612 having a main segment shielding electrode 1612*a* along the direction of the data line 1604 and covered a part of the pixel electrode 1610, and at least one minor segment shielding electrode 1612*b* electrically connected to the main segment shielding electrode 1612*a*. The shielding electrode 1612, and the scan line 1606 are made by the same metal layer. The shielding electrode 1612 and the pixel electrode 1610 being covered by the shielding electrode 1612 make up a storage capacitance 1618.

Figure 18:
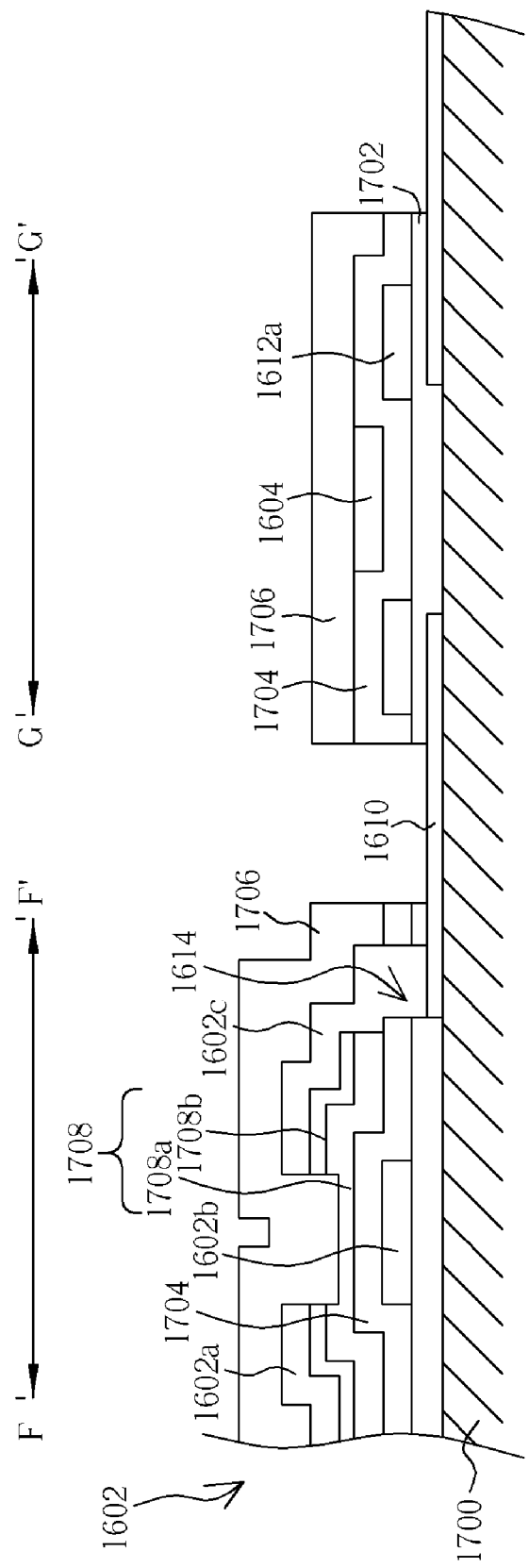
FIG. 18 schematically illustrates the manufacture of FIG. 17 along lines FF' and GG'.

Referring to FIG. 18 schematically illustrates the manufacture of FIG. 17 along lines FF' and GG'. Referring to FIG. 18. A plurality of pixel electrodes 1610 are formed on the substrate 1700. A barrier pattern layer 1702 covers the pixel electrode 1610 and the substrate 1700. Then, a patterning metal layer is formed as a scan line 1606, a gate 1602*b* of a TFT 1602, and the shielding electrode 1612. The scan line 1606 is along the first direction in an arrangement, and the main segment shielding electrode 1612*a* is along the second direction in an arrangement. Next, an insulating layer such as a gate insulating layer 1704, which is formed by a plasma chemical vapor deposition process.

Thereafter, a transistor channel 1708 is formed on the gate insulating layer 1704. The transistor channel 1708 includes a channel layer 1708*a* and an ohm contact pattern layer 1708*b*. Next, at least one contact hole 1614 is formed on the pixel electrode to expose a part of the pixel electrode. Then, a patterning metal layer is formed as a source 1602*a* of the TFT 1602, a drain 1602*c* of the TFT, and the data line 1604. The source 1602*a* and the drain 1602*c* are location on the ohm contact pattern layer 1708*b*. A data line 1604 is along the second direction in an arrangement and parallels the main segment shielding electrode 1612*a*. The drain 1602*c* via the contact hole 1614 electrically connects to the pixel electrode 1610. Thereafter, a dielectric layer 1706 is formed on the TFT 1602, a data line 1604, and the gate insulating layer 1704, as a passivation layer, which can be comprises silicon nitride, silicon oxide, silicon oxynitride, combinations thereof, or similar combinations. An etching process is performed, removing the unnecessary dielectric layer 1706 on the pixel electrode 1610 and the gate insulating layer 1704. In the present embodiment, the main storage capacitance is formed by the pixel electrode 1610, a barrier pattern layer 1702, and the shielding electrode 1612.

Please notice, the present invention is not necessarily limited to the source electrically connected to the data line, and the drain electrically connected to the pixel electrode. The present invention also can utilize the drain electrically connected to the data line, and the source electrically connected to the pixel electrode. However, such cosmetic structural changes would still follow the teachings of the present invention.

As the structure of the present invention is formed by a shielding electrode between the pixel electrode layer and the main data line section, the Cpd between the data line section and the pixel electrode will be decreased by the shielding effect. The capacitance dielectric layer of the storage capacitance only uses the passivation layer or one of insulating layers as the gate insulating layers. This layer will be thinner than the two layers of the prior art. Therefore, the value of the storage capacitance increases, the display effect of the LCD is improved, and the design space of the aperture ratio becomes greater.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A pixel structure in a liquid crystal display (LCD), comprising:
   at least one scan line disposed on a substrate and along a first direction in an arrangement;
   at least one connecting electrode disposed on the substrate and along a second direction in an arrangement;
   at least one first data line section and at least one second data line section disposed on the substrate and along the second direction in the arrangement, wherein the first data line section through the connecting electrode electrically connects to the second data line section to form at least one data line, and the data line crosses over the scan line;
   at least one thin-film transistor (TFT) having a gate electrically connected to the scan line, a source electrically connected to the data line, and a drain;
   at least one shielding electrode disposed on the substrate, and the shielding electrode having a main segment being substantially parallel to the data line and along the second direction in the arrangement, wherein the shielding electrode, the source, and the drain are formed by the same metal layer, and the data line is made by at least two metal layers, each having a plurality of metal pattern layers that are electrically connected to each other and not formed simultaneously; and
   a pixel electrode disposed on the substrate, a part of the pixel electrode covering the shielding electrode and electrically connected to the drain;
   wherein the part of the shielding electrode being substantially parallel to the data line is disposed between the pixel electrode and the data line, and at least one dielectric layer disposed between the shielding electrode, the pixel electrode and the data line.

2. The pixel structure of claim 1, wherein the pixel electrode and the part of the shielding electrode covered by the pixel electrode form a storage capacitance.

3. The pixel structure of claim 1, wherein the shielding electrode comprises a least one minor segment being electrically connected to the main segment.

4. A pixel structure in a liquid crystal display (LCD), comprising:
   a pixel electrode;
   at least one data line disposed on a substrate and along a first direction in an arrangement;
   at least one scan line disposed on the substrate and along a second direction in an arrangement, and the scan line crosses over the data line;
   at least one thin film transistor (TFT) having a gate electrically connected to the scan line, a source electrically connected to the date line, and a drain electrically connected to the pixel electrode; and
   at least one shielding electrode having a main segment being substantially parallel to the data line along the second direction in the arrangement and covering part of the pixel electrode, wherein the shielding electrode and the scan line are made by the same metal layer;
   wherein the part of the shielding electrode being substantially parallel to the data line disposed between the pixel electrode and the data line, and at least one dielectric layer disposed between the shielding electrode, the pixel electrode and the data line.

5. The pixel structure of claim 4, wherein the shielding electrode and the part of the pixel electrode covered by the shielding electrode form a storage capacitance.

6. The pixel structure of claim 4, wherein the shielding electrode comprises at least one minor segment being connected to the main segment.

7. A liquid crystal display (LCD), comprising:
   at least one scan line, and at least one connecting electrode disposed on a substrate and along a first direction in an arrangement and a second direction in an arrangement, respectively;
   at least one insulating layer disposed on the substrate and covering a scan line and the connecting electrode, and the insulating layer having at least one first hole positioned on the connecting electrode to expose the part of the connecting electrode;
   at least one channel layer disposed on the insulating layer and positioned on the scan line;
   at least one ohm contact pattern layer disposed on the channel layer;
   at least one metal layer having a first segment, a second segment, and a third segment disposed on the ohm contact pattern layer, the insulating layer, and the first hole, respectively, the first part of the metal layer disposed on the scan line defining a source/drain to form a thin film transistor (TFT), and the second part of the metal layer disposed on the insulating layer defining at least one shielding electrode having a main segment being substantially parallel to the connecting electrode and along the second direction in the arrangement, and the third part of the metal layer defining a metal section across the scan line through the first hole electrically connected to the connecting electrode to form at least one data line;
   at least one passivation layer covering the metal layer, and the passivation layer having at least one second hole positioned on the source/drain; and
   at least one pixel electrode, disposed on the passivation layer and covering the part of the shielding electrode, and through the second hole electrically connected to the source/drain.

8. The LCD of claim 7, wherein the pixel electrode and the part of the shielding electrode covered by the pixel electrode form a storage capacitance.

9. An liquid crystal display (LCD), comprising:
   at least one scan line and at least one connecting electrode disposed on a structure and along a first direction in an arrangement and a second direction in an arrangement, respectively;
   at least one insulating layer disposed on the structure and covering the scan line and the connecting electrode, and the insulating layer having at least one first hole to expose a part of the connecting electrode;
   at least one channel layer disposed on the insulating layer;
   at least one etching stop pattern layer disposed on the channel layer substantially corresponding to the scan line;
   at least one ohm contact pattern layer disposed on a part of the channel layer and covering the two ends of the etching stop pattern layer;
   at least one metal layer having a first segment, a second segment, and a third segment disposed on the ohm contact pattern layer and in the first hole, respectively, the first segment of the metal layer defining a source/drain to form a thin film transistor (TFT), the second segment of the metal layer defining a shielding electrode having at least one main segment being substantially parallel to the connecting electrode and along the second direction in the arrangement, and the third segment of the metal layer defines a metal section across over the scan line and through the first hole electrically connected to the connecting electrode to form a data line;

at least one passivation layer disposed on the metal layer, and the passivation layer having at least one second hole positioned on the source/drain; and at least one pixel electrode, disposed on the passivation layer and covering the shielding electrode, and through the second hole electrically connected to the source/drain.

10. The LCD of claim 9, wherein the pixel electrode and the part of the shield electrode covered by the pixel electrode form a storage capacitance.

11. A liquid crystal display (LCD), comprising:

at least one pixel electrode disposed on a substrate;

at least one barrier pattern layer disposed on the substrate and covering the part of the pixel electrode;

at least one scan line and at least one shielding electrode disposed on the barrier pattern layer, the scan line being along a first direction in an arrangement, the shielding electrode having at least one main segment covering the part of the pixel electrode and being along a second direction in an arrangement;

at least one insulating layer disposed on the barrier pattern layer and covering the scan line and the shielding electrode, and the insulating layer having at least one first hole;

at least one channel layer and at least one ohm contact pattern layer sequentially disposed on the insulating layer;

at least one metal layer having a first segment, and a second segment disposed on the ohm contact pattern layer and the insulating layer, respectively, the first segment of the metal layer to form a data line which is substantially parallel to the main segment of the shielding electrode and along the second direction in the arrangement, and the second segment of the metal layer disposed on the scan line defining a source/drain to form a TFT, wherein the source electrically connected to the data line, the drain through the first hole electrically connected to the pixel electrode; and at least one passivation layer covering the metal layer and the barrier pattern layer.

12. The LCD of claim 11, wherein the shielding electrode and the part of the pixel electrode covered by the shielding electrode form a storage capacitance.

13. An liquid crystal display (LCD), comprising:

at least one barrier pattern layer disposed on a substrate;

at least one metal layer disposed on the barrier pattern layer, the metal layer having at least one first segment and a second segment, the first segment defining a source/drain, and the second segment defining at least one data line;

at least one ohm contact pattern layer disposed on the first part;

at least one channel layer disposed on the ohm contact pattern layer;

at least one insulating layer disposed on the channel layer;

at least one scan line and at least one shielding electrode disposed on the insulating layer, the shielding electrode having at least one main segment which is substantially parallel to the data line;

at least one passivation layer covering the scan line and the shielding electrode, the passivation layer having at least one second hole positioned on the source/drain; and at least one pixel electrode, disposed on the passivation layer and covering the part of the shielding electrode, and through the second hole electrically connected to the source/drain.

14. The LCD of claim 13, wherein the pixel electrode and the part of the shielding electrode covered by the pixel electrode form a storage capacitance.

15. The LCD of claim 13, wherein the LCD further comprises:

a light shielding layer, disposed between the barrier pattern layer and the substrate, and substantially corresponding to the scan line and the data line.

16. A method for manufacturing a liquid crystal display (LCD) comprising:

forming at least one scan line and at least one connecting electrode on a substrate and along a first direction in an arrangement and a second direction in an arrangement, respectively;

forming at least one insulating layer on the substrate and covering the scan line and the connecting electrode, wherein the insulating layer has at least one first hole positioned on the connecting electrode to expose part of the connecting electrode;

forming at least one channel layer on the insulating layer and the channel layer positioned on a gate of the scan line;

forming at least one ohm contact pattern layer on the channel layer;

forming at least one metal layer on the ohm contact pattern layer, the insulating layer, and in the first hole, respectively, the metal layer positioned on the scan line defining a source/drain to form a thin film transistor (TFT), the metal layer positioned on the insulating layer defining at least one shielding electrode, and the shielding electrode having at least one main segment which is substantially parallel to the connecting electrode and being disposed between an edge of the pixel electrode and the connecting electrode, and at least one part of the metal layer crossing over the scan line and through the first hole electrically connected to the connecting electrode to form a data line;

covering at least one passivation layer on the metal layer, the passivation layer having at least one second hole positioned on the source/drain; and forming at least one pixel electrode on the passivation layer and covering part of the shielding electrode, and the pixel electrode through the second hole electrically connected to the source/drain.

17. The method of claim 16, wherein the pixel electrode and the shielding electrode covered by the pixel electrode form a storage capacitance.

18. A method for manufacturing a liquid crystal display (LCD), comprising:

forming at least one pixel electrode on a substrate;

forming at least one barrier pattern layer on the substrate and covering the part of the pixel electrode;

forming at least one scan line and at least one shielding electrode on the barrier pattern layer, the scan line being along a first direction in an arrangement, and the shielding electrode having at least one main shielding electrode covering the part of the pixel electrode and being along a second direction in an arrangement;

forming at least one insulating layer on the barrier pattern layer and covering the scan line and the shielding electrode;

sequentially forming at least one channel layer and at least one ohm contact pattern layer on the insulating layer;

forming a first hole in the pixel electrode and removing the barrier pattern layer and the insulating layer positioned on the pixel electrode;

forming one metal layer as a data line and a source/drain, the data line being substantially parallel to the main shielding electrode and along the second direction in the arrangement, and the source/drain being positioned on a gate of the scan line to form a thin film transistor (TFT), the source being electrically connected to the data line, and the drain through the first hole electrically connected to the pixel electrode; and covering at least one passivation layer on the metal layer and the barrier pattern layer.

19. The method of claim 18, wherein the shielding electrode and the part of the pixel electrode covered by the shielding electrode form a storage capacitance.

20. A method for manufacturing a liquid crystal display (LCD), comprising:

forming at least one barrier pattern layer on a substrate;

forming at least one metal layer on the barrier pattern layer, the metal layer having at least one first segment and a second segment, the first segment defining a source/drain, the second segment defining at least one data line;

sequentially forming at least one ohm contact pattern layer and a channel layer on the source/drain;

forming at least one insulating layer on the channel layer and covering the data line;

forming at least one scan line and at least one shielding electrode on the insulating layer, the shielding electrode having at least one main segment being substantially parallel to the data line;

forming at least one passivation layer on the barrier pattern layer to cover the scan line and the shielding electrode, the passivation layer having at least one hole positioned in one of the source/drain; and forming at least one pixel electrode on the passivation layer to cover part of the shielding electrode and through the hole electrically connected to one of the source/drain.

21. The method of claim 20, wherein the pixel electrode and the part of the shielding electrode covered by the pixel electrode form a storage capacitance.

22. The method of claim 20, further comprising:

forming a light shielding layer between the barrier pattern layer and the substrate to substantially corresponding to the scan line and the data line.

23. A method for manufacturing a liquid crystal display (LCD), comprising:

forming at least one scan line and at least one connecting electrode on a substrate and along a first direction in an arrangement and a second direction in an arrangement, respectively;

forming at least one insulating layer on the substrate and covering a gate of the scan line and the connecting electrode;

forming at least one channel layer on part of the insulating layer;

forming at least one etching stop pattern layer on the channel and being substantially corresponding to the gate;

forming at least one ohm contact pattern layer on the part of the channel layer and covering the two ends of the etching stop pattern layer;

forming a first hole in the insulating layer to expose the part of the connecting electrode;

forming a metal layer having a first segment, a second segment and a third segment, the first segment positioned on the gate defined a source/drain to form a TFT, the second segment defining at least one shielding electrode, the part of the shielding electrode being substantially parallel to the connecting electrode, and the third part as a metal section to cross the scan line and through a first hole electrically connected to the connecting electrode to form a data line;

covering at least one passivation layer on the metal layer, the passivation layer having at least one second hole positioned in the source/drain; and forming at least one pixel electrode on the passivation layer to cover the part of the shielding electrode and through the second hole electrically connected to the source/drain.

24. The method of claim 23, wherein the pixel electrode and the part of the shielding electrode covered by the pixel electrode form a storage capacitance.

* * * * *